(12) United States Patent
Neumann et al.

(10) Patent No.: US 6,284,327 B1
(45) Date of Patent: Sep. 4, 2001

(54) PROCESS FOR MAKING A RADIATION CURED CEMENT BOARD SUBSTRATE

(75) Inventors: Paul Neumann, Louisville, KY (US); Donald P. Hart, Jr., Pittsburgh, PA (US)

(73) Assignee: Universal Woods Incorporated, Louisville, KY (US)

( * ) Notice: Subject to any disclaimer, the term of this patent is extended or adjusted under 35 U.S.C. 154(b) by 0 days.

(21) Appl. No.: 09/352,020

(22) Filed: Jul. 12, 1999

(51) Int. Cl.$^7$ ........................................................ C08F 2/46
(52) U.S. Cl. ........................ 427/493; 427/230; 427/385.5; 427/386; 427/407.1; 427/496; 427/500; 427/508; 427/553; 427/558; 427/559
(58) Field of Search ..................................... 427/496, 500, 427/508, 553, 558, 559, 230, 385.5, 386, 407.1

(56) References Cited

U.S. PATENT DOCUMENTS

| | | |
|---|---|---|
| 4,395,263 | 7/1983 | Davis . |
| 4,738,949 | 4/1988 | Sethi et al. . |
| 5,013,711 | 5/1991 | Egashira et al. . |
| 5,053,382 | 10/1991 | Akada et al. . |
| 5,149,592 | 9/1992 | Wojnarowicz . |
| 5,153,169 | 10/1992 | Freedman et al. . |
| 5,234,983 | 8/1993 | Valenty . |
| 5,354,794 | 10/1994 | Stevenson et al. . |
| 5,371,058 | 12/1994 | Wittig, Jr. et al. . |
| 5,387,573 | 2/1995 | Oldfield et al. . |
| 5,405,824 | 4/1995 | Takiguchi et al. . |
| 5,426,088 | 6/1995 | Janssens et al. . |
| 5,427,997 | 6/1995 | Oshima et al. . |
| 5,432,145 | 7/1995 | Oshima et al. . |
| 5,478,629 | 12/1995 | Norman . |
| 5,494,885 | 2/1996 | Kudo et al. . |
| 5,514,637 | 5/1996 | Lum et al. . |
| 5,527,759 | 6/1996 | Oshima et al. . |
| 5,538,831 | 7/1996 | Oshima et al. . |
| 5,545,606 | 8/1996 | Takiguchi et al. . |
| 5,559,077 | 9/1996 | Martin . |
| 5,571,765 | 11/1996 | VanMaele et al. . |
| 5,646,089 | 7/1997 | Oshima et al. . |
| 5,658,848 | 8/1997 | Abe et al. . |
| 5,658,850 | 8/1997 | Taniguchi et al. . |
| 5,686,382 | 11/1997 | Suzuki et al. . |
| 5,710,096 | 1/1998 | Ohnishi et al. . |
| 5,718,792 | 2/1998 | Goode . |
| 5,728,645 | 3/1998 | Oshima et al. . |
| 5,750,240 | 5/1998 | Findley et al. . |
| 5,753,589 | 5/1998 | Takao et al. . |

FOREIGN PATENT DOCUMENTS 52-009035 * 1/1977 (JP) .

* cited by examiner

*Primary Examiner*—Bernard Pianalto
(74) *Attorney, Agent, or Firm*—Charles G. Lamb; Middleton & Reutlinger

(57) ABSTRACT

A coated cement board article capable of receiving a sublimatable ink and a process for making same includes coating a cement board substrate with a radiation curable top coat. The radiation curable top coat is subjected to a curing step which includes curing with either an electron beam, ultraviolet radiation or a combination thereof. A sublimatable ink may be transferred into the top coat.

22 Claims, 1 Drawing Sheet

PROCESS FOR MAKING A RADIATION CURED CEMENT BOARD SUBSTRATE

BACKGROUND OF THE INVENTION

The invention relates to a process for making a cement board substrate capable of accepting sublimatable inks which and more particularly relates to an article and a process for making a coated substrate which has been subjected to curing by an electron beam (EB) or ultraviolet (UV) radiation.

It is known in the prior art to transfer sublimatable inks to a coated substrate wherein the inks on the substrate provide designs of selected indicia thereon. The indicia may be in the form of art work, advertisements, slogans and the like. However, after transferring the inks to the coated substrates, in order to protect the indicia from fading over time from ultraviolet radiation, clear films or conventional solvent-borne coatings have been used to cover the indicia coated substrate.

Generally, for the ink sublimation process, a desired design using a sublimatable ink is first printed onto a paper backing sheet by conventional printing techniques. The paperback sheet having the sublimatable ink thereon is then transferred under heat and pressure from the backing sheet to the article upon which the design is to be imprinted. After the ink has been transferred to the selected article, such as a wood, ceramic, plastic or the like, the product can be utilized indoors. If fade resistance to UV exposure is required, the product can be coated or a clear film, such as a polypropylene film, may be placed over ink printed indicia and under heat and pressure adhered to the ink faced surface.

SUMMARY OF THE INVENTION

It is an object of the present invention to provide a cement board product capable of accepting a sublimatable ink.

It is another object of the present invention to provide a process for curing ultraviolet protected coated cement board which are capable of receiving a sublimatable ink.

It is even a further object of the present invention to provide a process for making a printed cement board article including a coating over the article wherein the coating includes compounds therein, such as benzotriazoles, hindered amine light stabilizers and the like, which provide UV protection.

More particularly the present invention is directed to a process for making a cured coated cement board article comprising: coating a cement board substrate with a radiation curable top coat; and, curing said top coat with ultraviolet radiation. A sublimatable ink may be transferred to the top coat.

BRIEF DESCRIPTION OF THE DRAWINGS

A better understanding of the invention will be had upon reference to the following description in conjunction with the accompanying drawings in which like numerals refer to like parts throughout the several views and wherein.

DETAILED DESCRIPTION OF THE PREFERRED EMBODIMENTS

Figure 1:
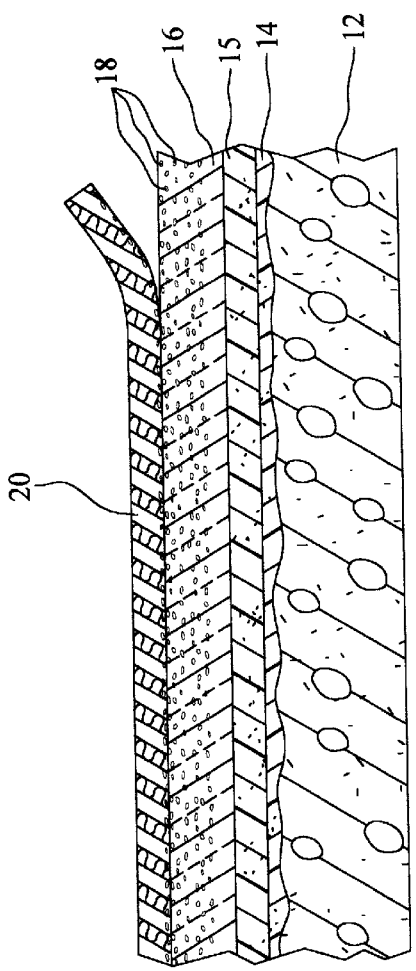
FIG. 1 is a cross-sectional view of a substrate coated according to a process of the present invention showing the transfer of the sublimatable ink from a paper backing; and, FIG. 2 is a cross-sectional view of the substrate of FIG. 1 after the sublimatable ink has been transferred.

As shown in the figures, a cement board substrate 12 is coated with a UV or EB/UV cured clear topcoat 16 to which a sublimatable ink is to be applied. Preferably, the substrate is coated first with a filling or sealing coating 14 of a polyester or epoxy acrylate to fill in irregularities of the substrate 12. The optional fill layer 14 is cured with UV radiation with, for example, 8 lamps at 300 watts and a line speed of 65 feet per minute. The substrate 12 is then sanded both to increase smoothness and to provide a better physical bond for subsequent layers.

In the coating of the cement board substrate 12, the cement board 12 is sanded, filled with a filling compound, and cured. This sanding, filling, and curing is usually repeated until the board surface is smooth and defect free. Usually in the first sanding a belt sander of relatively coarse material, such as 80 to 120 grit, with a belt speed of the sander run at a relatively slow rate of about 50 feet per minute is used as it is relatively difficult to make the board flat and to remove as many surface defects as possible. In the subsequent sand, fill, and cure runs the sander uses a much finer paper, usually about 600 grit, at a much faster speed, usually about 100 feet per minute and with just enough pressure to sand the entire surface. Generally, three successive passes of sanding, filling and curing is performed prior to coating with a white layer coating.

The filled substrate 12 is then coated with a white layer 15, typically a polyester or urethane acrylate EB or other UV curable product, of 0.2 to 4 mils preferably about 1.5 mils in thickness, and then overcoated with a clear layer or top coat 16. The top coat 16 can be one of a number of clear UV or EB/UV curable products including, but not limited to, polyesters, urethane acrylates, polyester acrylates, and epoxy acrylates as well as cationic cured systems which are well known in the art. These coatings may also be formulated with a variety of additives to protect both the coatings and inks from fading due to exposure to sun or other light sources. The top coat 16 will generally be about 2 to 6 mils in thickness but a preferred thickness is of about 2.8 mils. The preferred coating is a urethane acrylate/polyester acrylate blend with additives such as UV absorbers and hindered amine light stabilizers at about a 3% level.

The coated substrate is then cured with an electron beam at from 100 to 500 Kv with preferred settings at 245 Kv and 50 milliamps and a line speed of about 90 feet a minute, preferably in an inert nitrogen atmosphere. Alternatively, if a lower gloss is desired, the product is cured with a similar line speed and electron beam settings, but with a mixed nitrogen/oxygen atmosphere, preferably of 94% nitrogen and 6% oxygen. This is followed by a UV cure in an inert atmosphere, such as nitrogen, with 6 lamps at 200 watts and a line speed of 100 feet per minute.

Another curing method includes curing the coating with ultraviolet radiation only. This cure can be carried out in an atmosphere ranging from 0 to 100% air with the balance typically made up of nitrogen. Lamp intensity will usually vary from 200 watts to 700 watts/inch cure systems with a typical setting of 300 watts/inch. If a white layer is utilized, one preferred cure would be with a gallium doped mercury bulb UV system, typically at 300 watts/inch in air. It would typically be sanded after curing prior to the application of the clear top coat or alternatively, the white coat may be slightly undercured to allow for a chemical bond between the two coating layers.

The electron beam or UV radiation treated substrate is now susceptible to the receipt of a sublimatable ink from a paper backed material and is identified in FIG. 1 by the numeral 20. The paper backed material 20 includes the sublimatable ink 18 thereon which is to be transferred to the second or top coat 16. The paper backing 20 with the ink 18 thereon is placed onto the top surface of the top coat 16 with heat and sufficient pressure to hold the backing 20 firmly against the substrate 12. The ink is transferred to the clear top coat 16 usually at from about 350° F. to 400° F.

Figure 2:
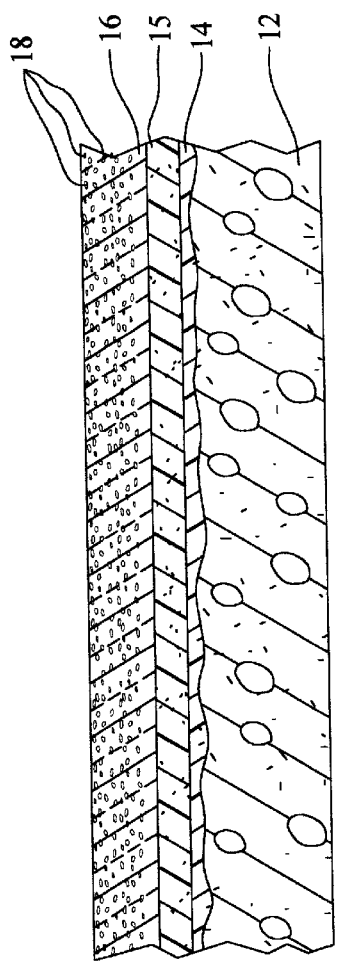

FIG. 2 shows the finished product after the sublimatable ink 18 has been transferred from the paper backing 20. As shown, the sublimatable ink 18 penetrates into the clear coating 16 generally to a sufficient depth so as to be protected against the elements and particularly ultraviolet radiation over prolonged periods of time.

The cement board laminated article is generally in tile form and is usable on walls with selected decorative designs therein.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A process for making a cured coated cement board article comprising:

coating a cement board substrate with a radiation curable top coat;

curing said top coat with an electron beam, ultraviolet radiation, or a combination thereof; and, transferring a sublimatable ink to said top coat, said sublimatable ink penetrating into said top coat.

2. The process of claim 1, wherein said transferring includes placing a paperbacked sublimatable ink on said top coat at 350° F. to 400° F. with sufficient pressure to transfer said ink into said top coat.

3. The process of claim 1 wherein said top coat includes UV protection additives therein.

4. The process of claim 1 including the step of filling said substrate with a filling compound to form a fill substrate prior to coating with a radiation curable top coat.

5. The process of claim 4 wherein said filling compound is a polyester or an epoxy acrylate.

6. The process of claim 4 including curing of said filling compound with ultraviolet radiation.

7. The process of claim 6 including the step of sanding said cured substrate prior to coating with said radiation curable top coat.

8. The process of claim 4 wherein said coating includes a first coating of said fill substrate with a white coat and a second coating of said radiation curable top coat.

9. The process of claim 8 wherein said white coat is a polyester acrylate or a urethane acrylate, said white coat being electron beam or ultraviolet curable.

10. The process of claim 8 wherein said white coat is from 0.5 to 4.0 mils in thickness.

11. The process of claim 8, said radiation curable top coat being from 0.2 to 6.0 mils in thickness.

12. The process of claim 11, said thickness being about 2.8 mils.

13. The process of claim 1, said electron beam curing being in an atmosphere of nitrogen.

14. The process of claim 1, said electron beam curing being in an atmosphere of about 94% nitrogen and 6% oxygen.

15. The process of claim 1, said ultraviolet curing being in a nitrogen atmosphere.

16. The process of claim 1, said electron beam curing being at 245 Kv and 50 milliamps.

17. The process of claim 1, said ultraviolet curing being in a nitrogen atmosphere with six lamps at 200 watts and a line speed of approximately 100 feet per minute.

18. The process of claim 1, said ultraviolet radiation curing being in an atmosphere of 0 to 100% air with the balance being nitrogen.

19. The process of claim 1, including a first passing step comprising sanding the substrate, filling the substrate with a filling compound and curing said filling prior to coating of the cement board substrate with a radiation cured top coat.

20. The process of claim 19, including a second passing and a third passing, each of said second passing and said third passing being a repeat of said first passing.

21. The process of claim 20, said first passing including sanding with a belt sander of 80 to 120 grit material at a rate of about 50 feet per minute.

22. The process of claim 21, said second passing and said third passing including sanding with a belt sander of about 600 grit material at a rate of about 100 feet per minute.

* * * * *